(12) United States Patent  (10) Patent No.: US 8,553,114 B2
Uchida  (45) Date of Patent: Oct. 8, 2013

(54) IMAGE SENSING APPARATUS AND IMAGE SENSING SYSTEM

(75) Inventor: Mineo Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 889 days.

(21) Appl. No.: 12/038,529

(22) Filed: Feb. 27, 2008

(65) Prior Publication Data

US 2008/0211946 A1    Sep. 4, 2008

(30) Foreign Application Priority Data

Mar. 1, 2007 (JP) ................................ 2007-051935

(51) Int. Cl.
*H04N 3/14* (2006.01)
*H04N 5/335* (2011.01)

(52) U.S. Cl.
USPC ........................... 348/294; 348/302; 348/308

(58) Field of Classification Search
USPC ....................................................... 348/294
See application file for complete search history.

(56) References Cited

U.S. PATENT DOCUMENTS

| | | | |
|---|---|---|---|
| 5,880,691 A | 3/1999 | Fossum et al. | |
| 6,791,607 B1 * | 9/2004 | Bilhan et al. | 348/243 |
| 6,965,407 B2 * | 11/2005 | Boemler et al. | 348/302 |
| 7,310,452 B2 * | 12/2007 | Nam | 382/312 |
| 7,701,497 B2 * | 4/2010 | Fraenkel et al. | 348/294 |
| 2006/0044424 A1 * | 3/2006 | Shirai et al. | 348/241 |
| 2007/0194962 A1 * | 8/2007 | Asayama et al. | 341/144 |

FOREIGN PATENT DOCUMENTS

| | | |
|---|---|---|
| JP | 5-048460 | 2/1993 |
| JP | 5-153428 | 6/1993 |
| JP | 2000-224440 | 8/2000 |
| JP | 2004-015712 A | 1/2004 |
| JP | 2005-101985 A | 4/2005 |
| JP | 2006-157242 A | 6/2006 |
| JP | 2006-157263 A | 6/2006 |
| JP | 2006-222907 A | 8/2006 |

\* cited by examiner

*Primary Examiner* — Sinh Tran
*Assistant Examiner* — Christopher K Peterson
(74) *Attorney, Agent, or Firm* — Cowan, Liebowitz & Latman, P.C.

(57) ABSTRACT

An image sensing apparatus comprises an image sensing element having an image sensing unit configured to include an effective pixel area in which light is incident on arrayed pixels and a shading pixel area in which the arrayed pixels are shaded, analog-to-digital conversion units connected one-to-one to columns of the arrayed pixels, a feedback control unit configured to output, commonly on an input side of each of the analog-to-digital conversion units, an offset compensation signal for compensating for an amount of error between a reference value and an output signal of the shading pixel area output from at least one of the analog-to-digital conversion units, and offset compensation units arranged one-to-one on the input side of each of the analog-to-digital conversion units, and to compensate for offset by subtracting an output signal of the feedback control unit from an output signal of the effective pixel area.

4 Claims, 5 Drawing Sheets

IMAGE SENSING APPARATUS AND IMAGE SENSING SYSTEM

BACKGROUND OF THE INVENTION

1. Field of the Invention

The present invention relates to an image sensing apparatus such as a digital camera or a digital video camera, and to an image sensing system.

2. Description of the Related Art

With recent image sensing apparatuses such as digital cameras and digital video cameras, technology for reading out image signals from the image sensing element at high speed is required in order to increase pixel counts and improve continuous shooting speeds. In the case where signals read out at high speed are analog-to-digital (A/D) converted for every pixel, the conversion time per pixel data is extremely short. This requires extremely high-performance A/D converters capable of performing high-precision conversion in a short time, and is difficult to realize.

To solve this problem, research and development has been carried out into column analog-to-digital conversion (ADC) image sensing elements in which an A/D converter is disposed for every pixel column using CMOS image sensors that can be manufactured with a similar process to CMOS integrated circuits, and simultaneously performing A/D conversion on the respective pixel signals of one row of pixels. Column ADC image sensing elements are advantageous in that the readout rate of the image sensing element for a full image (one screen) can readily be increased, since the conversion rate of the A/D converters can be reduced from the readout rate of one pixel to the readout rate of one row.

Examples of such a column ADC image sensing element include an image sensor using ramp ADCs that apply a triangular wave (see Japanese Patent Laid-Open No. 05-048460) and an image sensor using successive approximation ADCs (see U.S. Pat. No. 5,880,691).

On the other hand, there are cases in which long exposures are made particularly in still photography. With this type of shooting, the charge accumulation period of the image sensing element is also lengthened, and dark current accumulates in the photodiode. Since this dark current component is read out together with the optical signal component when the pixel signals are read out, the dynamic range is compressed by the amount of dark current when A/D conversion is performed.

With a configuration in which one or more A/D converters are externally connected to the image sensing element in place of the column ADC system, an analog front end (AFE) having a programmable gain amplifier (PGA) function and an optical black (OB) clamp function in addition to the A/D conversion function is typically used. The offset of the image sensing element including dark current and the offset of the PGA and the A/D converters are removed using the OB clamp function. The OB clamp function adjusts the black level that includes dark current to a desired value, securing the dynamic range of the signals since A/D conversion is performed after the dark current component has thereby been eliminated.

In terms of circuit configurations for realizing this OB clamp function, there is disclosed a configuration utilizing an integrating circuit that uses a capacitor (see Japanese Patent Laid-Open No. 5-153428) and a configuration using a digital-to-analog (D/A) converter (see Japanese Patent Laid-Open No. 2000-224440).

Since the column ADC system is designed for reading out the signals of the image sensing element at high speed, it is normally premised on short exposures, which limits the dark current component produced per frame. Consequently, the dynamic range is not so adversely affected even when A/D conversion is performed without removing the dark current component. However, when application of this system to digital cameras and digital video cameras capable of also performing long exposures is considered, the removal of the dark current component is essential to securing the dynamic range.

However, since the column ADC system requires that A/D converters equal in number to the pixel columns be formed on the same semiconductor chip as the image sensing element, it is extremely difficult in terms of chip size to configure an OB clamp circuit for the A/D converter of each column.

Further, even assuming an OB clamp circuit is configured for each column, only the shading pixels in the columns can be utilized in OB clamping. The number of shading pixels provided per column is limited by chip size, this number being insufficient as information for use in OB clamping to sufficiently remove noise.

SUMMARY OF THE INVENTION

It is desirable to solve one or more of the above problems. It is also desirable to eliminate a dark current component with a simple configuration, and to secure dynamic range.

According to an aspect of the present invention, there is provided an image sensing apparatus comprising: an image sensing unit configured to have a plurality of pixels, each including a photoelectric conversion unit, that are arrayed, an effective pixel area in which light is incident on the photoelectric conversion units of the arrayed pixels, and a shaded pixel area in which the photoelectric conversion units of the arrayed pixels are shielded; a plurality of analog-to-digital conversion units configured to be connected one-to-one to columns of the arrayed pixels; a feedback control unit configured to output, commonly on an input side of each of the plurality of analog-to-digital conversion units, an offset compensation signal for compensating for an amount of error between a reference value and an output signal of the shaded pixel area output from at least one of the plurality of analog-to-digital conversion units; and a plurality of offset compensation units configured to be arranged one-to-one on the input side of each of the plurality of analog-to-digital conversion units, and to compensate for offset by subtracting an output signal of the feedback control unit from an output signal of the effective pixel area.

According to another aspect of the present invention, there is provided an image sensing apparatus comprising: an image sensing unit configured to have pixels, each including a photoelectric conversion unit, that are arrayed in a plurality of lines, an effective pixel area in which light is incident on the photoelectric conversion units of the pixels arrayed in a plurality of lines, a first shaded pixel area which is read out prior to the first readout line in the effective pixel area and in which the photoelectric conversion units of the pixels arrayed in a plurality of lines are shielded, and a second shaded pixel area which includes a readout line common with the effective pixel area and in which the photoelectric conversion units of the pixels arrayed in a plurality of lines are shielded; a plurality of analog-to-digital conversion units configured to be connected one-to-one to columns of the pixels arrayed in a plurality of lines; a feedback control unit configured to output, commonly on an input side of each of the plurality of analog-to-digital conversion units, an offset compensation signal for compensating for an amount of error between a reference value and an output signal from at least one of the plurality of analog-to-digital conversion units; and a plurality of offset compensation units configured to be arranged one-to-one on the input side of each of the plurality of analog-to-digital conversion units, and to compensate for offset by subtracting an output signal of the feedback control unit from an image sensing signal read out from the pixels, wherein the feedback control unit, when the first shaded pixel area is read out, outputs to an input of each of the plurality of offset compensation units a first offset compensation signal for compensating for an amount of error between the reference value and an output signal from at least one of the plurality of analog-to-digital conversion units, and, when the second shaded pixel area and the effective pixel area are read out, holds the first offset compensation signal from when the first shaded pixel area was read out, adds to the held first offset compensation signal a second offset compensation signal for compensating for an amount of error between the reference value and an output signal from at least one of the plurality of analog-to-digital conversion units, and outputs a resultant signal to the input of each of the plurality of offset compensation units.

According to further aspect of the present invention, there is provided an image sensing apparatus comprising: an image sensing unit configured to have pixels, each including a photoelectric conversion unit, that are arrayed in a plurality of lines, an effective pixel area in which light is incident on the photoelectric conversion units of the pixels arrayed in a plurality of lines, a first shaded pixel area which is read out prior to the first readout line in the effective pixel area and in which the photoelectric conversion units of the pixels arrayed in a plurality of lines are shielded, and a second shaded pixel area which includes a readout line common with the effective pixel area and in which the photoelectric conversion units of the pixels arrayed in a plurality of lines are shielded; a plurality of analog-to-digital conversion units configured to be connected one-to-one to columns of the pixels arrayed in a plurality of lines; a feedback control unit configured to output, commonly on an input side of each of the plurality of analog-to-digital conversion units, an offset compensation signal for compensating for an amount of error between a reference value and an output signal from at least one of the plurality of analog-to-digital conversion units; a plurality of first offset compensation units configured to be arranged one-to-one on the input side of each of the plurality of analog-to-digital conversion units, and to compensate for offset by subtracting an output signal of the feedback control unit from an image sensing signal read out from the pixels; and a second offset compensation unit configured to be arranged on an output side of the plurality of analog-to-digital conversion units, and to compensate for offset by subtracting an output signal of the feedback control unit from an output signal of each of the plurality of analog-to-digital conversion units, wherein the feedback control unit, when the first shaded pixel area is read out, outputs to an input of each of the plurality of first offset compensation units a first offset compensation signal for compensating for an amount of error between the reference value and an output signal from at least one of the plurality of analog-to-digital conversion units, and when the second shaded pixel area and the effective pixel area are read out, holds the first offset compensation signal, outputs the held first offset compensation signal to the input of each of the plurality of first offset compensation units, and outputs to the second offset compensation unit a second offset compensation signal for compensating for an amount of error between the reference value and an output signal from at least one of the plurality of analog-to-digital conversion units.

According to yet further aspect of the present invention, there is provided an image sensing system comprising: an optical system for forming an object image; and an image sensing apparatus of the present invention.

The present invention enables a dark current component to be eliminated with a simple configuration, and dynamic range to be secured.

Further features of the present invention will become apparent from the following description of exemplary embodiments (with reference to the attached drawings).

DESCRIPTION OF THE EMBODIMENTS

First Embodiment

Hereinafter, an image sensing apparatus according to preferred embodiments of the present invention will be described in detail with reference to the drawings.

Figure 1:
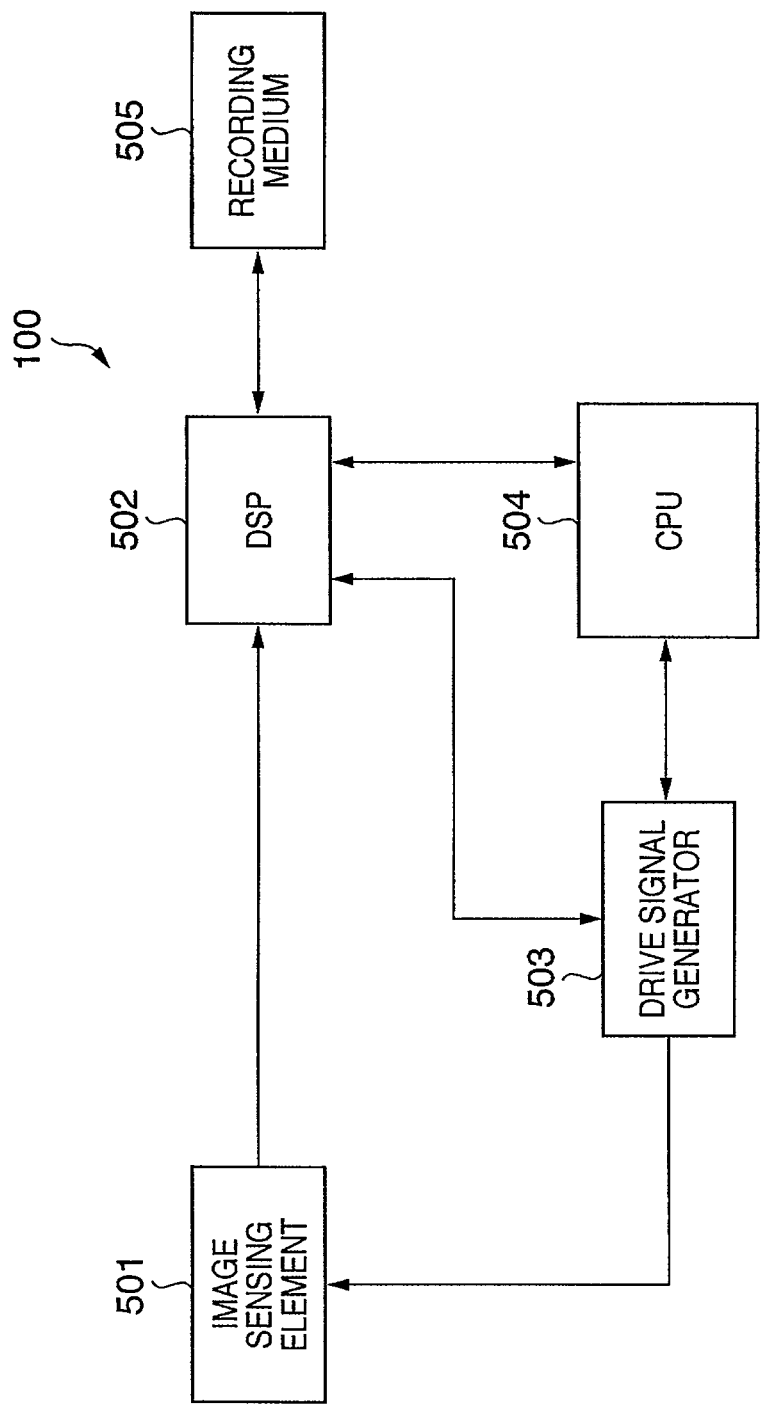
FIG. 1 is a block diagram showing the overall configuration of an image sensing apparatus according to preferred embodiments of the present invention.

FIG. 1 is a block diagram showing a schematic configuration of an image sensing apparatus 100 according to the preferred embodiments of the present invention.

Reference numeral 501 is an image sensing element that includes photoelectric conversion units for converting light (object image) to an electrical signal (signal charge), and amplification units for amplifying the signal charge of the photoelectric conversion units. The image sensing element 501, being further provided with an A/D conversion function (described below), outputs a digital signal.

Reference numeral 502 is a digital signal processor (DSP) that performs various correction processing and development processing on data (digital signal) from the image sensing element 501, and writes image data to a recording medium 505.

Reference numeral 503 is a drive signal generator that supplies drive signals such as a clock signal and a control signal to the image sensing element 501 and the DSP 502 under the control of a CPU 504.

Reference numeral 504 is a CPU that performs controls on the DSP 502 and the drive signal generator 503, and on a camera function realized by various constituent elements (not shown) that perform metering, focusing and the like (metering control unit, focusing control unit).

Reference numeral 505 is a recording medium such as a Compact Flash (registered trademark) card or the like for saving the image data of captured images, and is connected within the image sensing apparatus 100 via a connector (not shown).

The image sensing apparatus 100 constitutes an image sensing system by having attached thereto an optical system (not shown) for forming an object image, and is configured such that an object image which has passed through this optical system is formed on the image sensing element 501.

Figure 2:
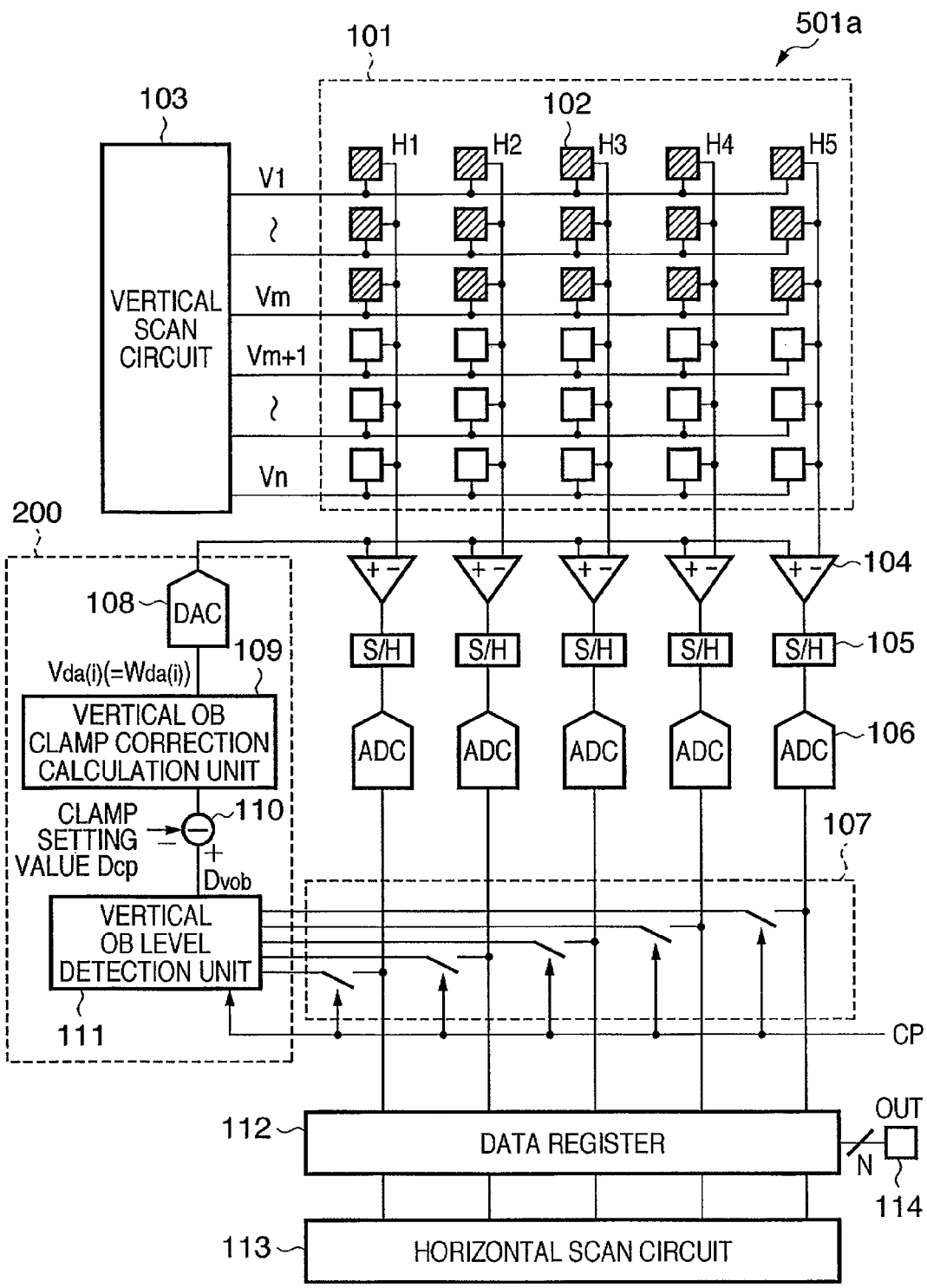
FIG. 2 is a block diagram showing a schematic internal configuration of an image sensing element according to a preferred first embodiment of the present invention.

FIG. 2 is a block diagram showing a schematic configuration of an image sensing element 501a according to a preferred first embodiment of the present invention. The image sensing element 501a according to the present embodiment is embodied as an example of the image sensing element 501 shown in FIG. 1.

An image sensing unit 101 is constituted by a plurality of pixels 102 that are two-dimensionally arrayed. The image sensing unit 101 converts incident light from the object to an electrical signal (image sensing signal). That is, the image sensing unit 101 performs image sensing with incident light from the object as an electrical signal (image sensing signal). Here, the pixels 102 connected to drive lines V1 to Vm are shading optical black (OB) pixels (shading pixels). The shading pixels will here be called vertical OBs, since they are disposed vertically in relation to the non-shading pixels (effective pixels). The pixels 102 connected to drive lines Vm+1 to Vn (n>m) are non-shading pixels (effective pixels). Consequently, light from the object is actually incident on only the effective pixels connected to the drive lines Vm+1 to Vn. A first shading pixel area in which the shading pixels are disposed as shown in FIG. 2 is read out prior to the reading out of the first drive line Vm+1 of the effective pixel area in which the effective pixels are disposed. In reading out the image sensing signals of the pixels 102 (reading out of the first shading pixel area), the drive line V1 for selectively driving the first row of the two-dimensionally arrayed pixels 102 is selected by the operation of a vertical scan circuit 103.

A drive signal is then supplied to the drive line V1 selected by the vertical scan circuit 103. The image sensing signals stored in the first row of pixels 102 connected to the drive line V1 are then input, via vertical output lines H1 to H5, to the inverting input terminals (−) of gain amplifiers 104 that function as offset compensation units and are connected one-to-one to the vertical output lines H1 to H5. To the other input (non-inverting input terminal (+)) of the gain amplifiers 104 is connected the common output of a D/A converter (DAC) 108 in a feedback control unit 200, with respect to all of the gain amplifiers 104 connected to the vertical output lines H1 to H5. That is, the gain amplifiers 104 amplify the difference between the image sensing signal from each of the vertical output lines H1 to H5 and the common output signal of the D/A converter 108.

Next, the output signals of the gain amplifiers 104 are input to and held by sample hold circuits (S/H) 105. The respective image sensing signals of the first row of pixels, held by the sample hold circuits 105, are input to A/D converters (ADC) 106 disposed one per pixel column. At the same time, the vertical scan circuit 103 sets the drive line V1 to a nonselected state, and starts transferring the image sensing signals of the second row of pixels 102 connected to the drive line V2 by supplying a drive signal to the drive line V2.

Image sensing signals converted to digital signals by the A/D converters 106 are held in a data register 112, and the (N-bit) data of the columns of the vertical output lines H1 to H5 is sequentially output to an output terminal (OUT) 114 by the operation of a horizontal scan circuit 113. The number of output lines can be reduced at this time by performing serialization using low-voltage differential signaling (LVDS) as the transmission system.

Switches 107 connected to the output of the A/D converters 106 of the columns are controlled by a clamp pulse (CP), and are only on while the data of the vertical OBs (i.e., pixels connected to drive lines V1 to Vm) is being output from the A/D converters 106. The data of the rows corresponding to the vertical OBs is input to a vertical OB level detection unit 111 in the feedback control unit 200 as a result of the clamp pulse CP being set to high and the switches 107 being turned on.

The feedback control unit 200 performs feedback control by outputting, commonly on the input side of each of the A/D converters 106, an offset compensation signal for compensating for the amount of error between a clamp setting value (reference value) and the output signal from at least one of the A/D converters 106. The feedback control unit 200 is constituted by the vertical OB level detection unit 111, a subtractor 110, a vertical OB clamp correction calculation unit 109, and the D/A converter 108.

The vertical OB level detection unit 111 computes the level (i.e., black level) of vertical OBs using a prescribed calculation method. While various calculation methods can be employed such as calculating median values or weighted averages, the calculation of the average value of one input row of pixels is given here as an example, with the computed result given as Dvob.

The calculation result of the vertical OB level detection unit 111 is input to the subtractor 110. The subtractor 110 subtracts a clamp setting value Dcp from the above Dvob, and inputs the amount of error between Dvob and the clamp setting value Dcp (=Dvob−Dcp) to the vertical OB clamp correction calculation unit 109.

The vertical OB clamp correction calculation unit 109 converts the error amount (Dvob−Dcp) to the input level of the gain amplifiers 104, using a conversion coefficient α set taking into account the circuit gain of the gain amplifiers 104, the sample hold circuits 105, and the A/D converters 106. The vertical OB clamp correction calculation unit 109 then computes a value to be set in the D/A converter 108. In this embodiment the vertical OB clamp correction calculation unit 109 also performs processing to multiply the detected error amount by a prescribed coefficient β, in case the effects of random noise, pixel defects or the like are not completely removed from the digital values reaching the data register 112, preventing the actual black level from being detected. Because the prescribed coefficient β is generally less than 1, this requires clamping to be performed over a plurality of rows. However, such processing can reduce the effects of, for example, random noise and pixel defects. If the detected error amount is too large, the vertical OB clamp correction calculation unit 109 may perform clipping or similar processing.

Here, the conversion coefficient for the above circuit gain component is given as α, the coefficient for eliminating the effects of random noise and pixel defects is given as β, and the clip threshold for the error amount is given as Dmax. A digital output signal Vda(i) of the vertical OB clamp correction calculation unit 109 when feedback of the i-th row has ended, that is, the setting value for the D/A converter 108, is thus represented by the following equation (1):

$$Vda(i)=\alpha*\beta*(Dvob-Dcp)+Vda(i-1)$$

$$(\text{if}(Dvob-Dcp)<Dmax)$$

$$Vda(i)=\alpha*\beta*Dmax+Vda(i-1)$$

$$(\text{if}(Dvob-Dcp)\geq Dmax) \qquad (1)$$

The D/A converter 108 outputs an analog signal Wda(i) corresponding to the digital output signal Vda(i) of the vertical OB clamp correction calculation unit 109, i.e. Wda(i)=Vda(i).

The analog output signal Wda(i) of the D/A converter 108 is then fed back commonly to the non-inverting input terminals (+) of the gain amplifiers 104 provided one for each column.

The image sensing signals from rows following the first row connected to the drive line V1 are sequentially read out by repeating the foregoing series of operations. The black level computed by the vertical OB level detection unit 111 gradually approaches the clamp setting value, as the processing by the vertical scan circuit 103 proceeds and the operation to read out each row of vertical OBs is repeated. At the point at which the m-th row, which is the last row of vertical OBs, is read out, the black level computed by the vertical OB level detection unit 111 substantially matches the clamp setting value. That is, the output signal of the D/A converter 108, which corresponds to the setting value Wda(m) at this point, substantially matches the signals of the OB pixels. The clamp pulse CP is set to low when the timing to output the data of the m+1-th row from the A/D converters 106 is reached. When the clamp pulse CP is low, the output signal of the vertical OB level detection unit 111 is fixed at the clamp setting value. As a result, the output signal (Dvob−Dcp) of the subtractor 110 will be 0, the output signal of the vertical OB clamp correction calculation unit 109 will be held at Vda(m), and the value of the D/A converter 108 will be held at Wda(m). The reading out of the m+1-th row onwards is continued in this state.

According to the above configuration, the value Wda(m) held when the shading pixel area was read out is used as the output value of the D/A converter 108 at the point at which the 1+m-th row is read out. Therefore, on the output side of each gain amplifier 104, a signal (optical signal) obtained by subtracting a signal of an amount equivalent to the black level at a pixel 102 from the image sensing signal read out from that pixel is output. A signal equivalent to the black level at a pixel 102 is thus subtracted from the image sensing signal read from that pixel, on the input side of each A/D converter 106. This enables the dynamic range of the A/D converters 106 to be effectively allocated to the optical signals and the dynamic range of the optical signals to be secured, even if the black level of the pixels 102 has a large value. As a result, the dynamic range of the optical signals can be secured even in shooting conditions where the image sensing signals from the pixels 102 include a large amount of dark current, such as with exposures at a high temperature or long exposures.

Figure 3:
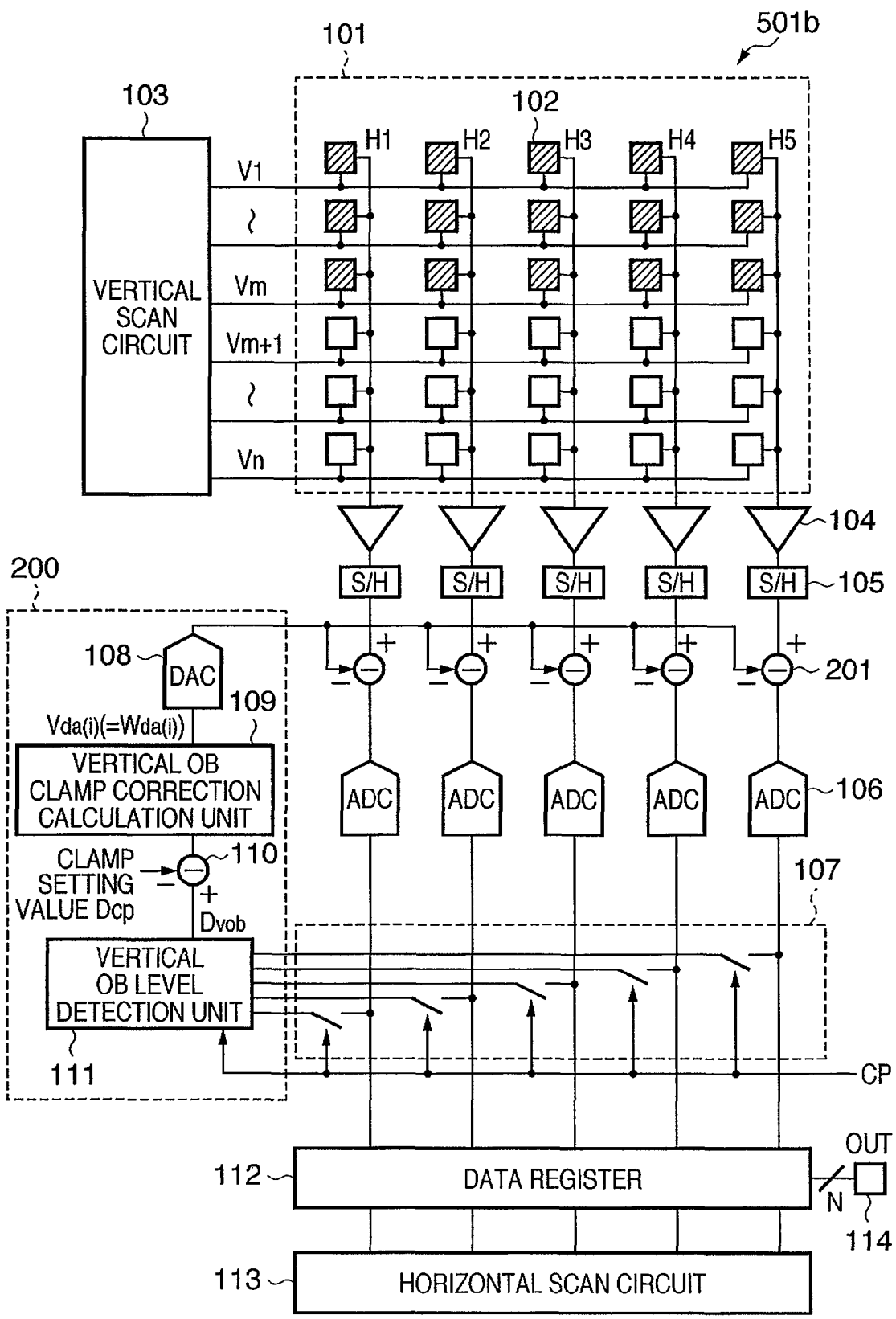
FIG. 3 is a block diagram showing another exemplary internal configuration of an image sensing element according to the preferred first embodiment of the present invention.

In the foregoing description, an OB clamp circuit is constituted using a D/A converter, with feedback being performed to the non-inverting input terminals (+) of the gain amplifiers 104. However, subtractors 201 that functions as offset compensation units may be provided so as to be on the output side of the sample hold circuits 105 and on the input side of the A/D converters 106 as shown in FIG. 3, and the output signal of the D/A converter 108 may be fed back to the subtractors 201. Other configurations may also be realized provided they enable the black level to be adjusted to a prescribed value, an example of which includes utilizing an integrating circuit that uses a capacitor such as disclosed in Japanese Patent Laid-Open No. 2000-224440, instead of utilizing a D/A converter.

Any configuration can be employed for the A/D converters 106 besides the aforementioned ramp A/D converter and successive approximation A/D converter, and it is sufficient for the A/D converters 106 to be disposed in correspondence to the vertical output lines H1 to H5.

In the foregoing description, the vertical OB level detection unit 111 computes an average value for all of the pixels in one horizontal line (pixel row), although the area for computing the average value may be restricted so as to compute the average value of a portion of the pixels. The computation of the black level is not limited to averaging. Any method may be used provided it is based on the pixel data of the vertical OBs, examples of which include computing median values or weighted averages.

In the foregoing description, an OB clamp operation is performed vertically on all of the rows of vertical OBs, although the area may be restricted and rows provided on which the OB clamp operation is not implemented.

Second Embodiment

Figure 4:
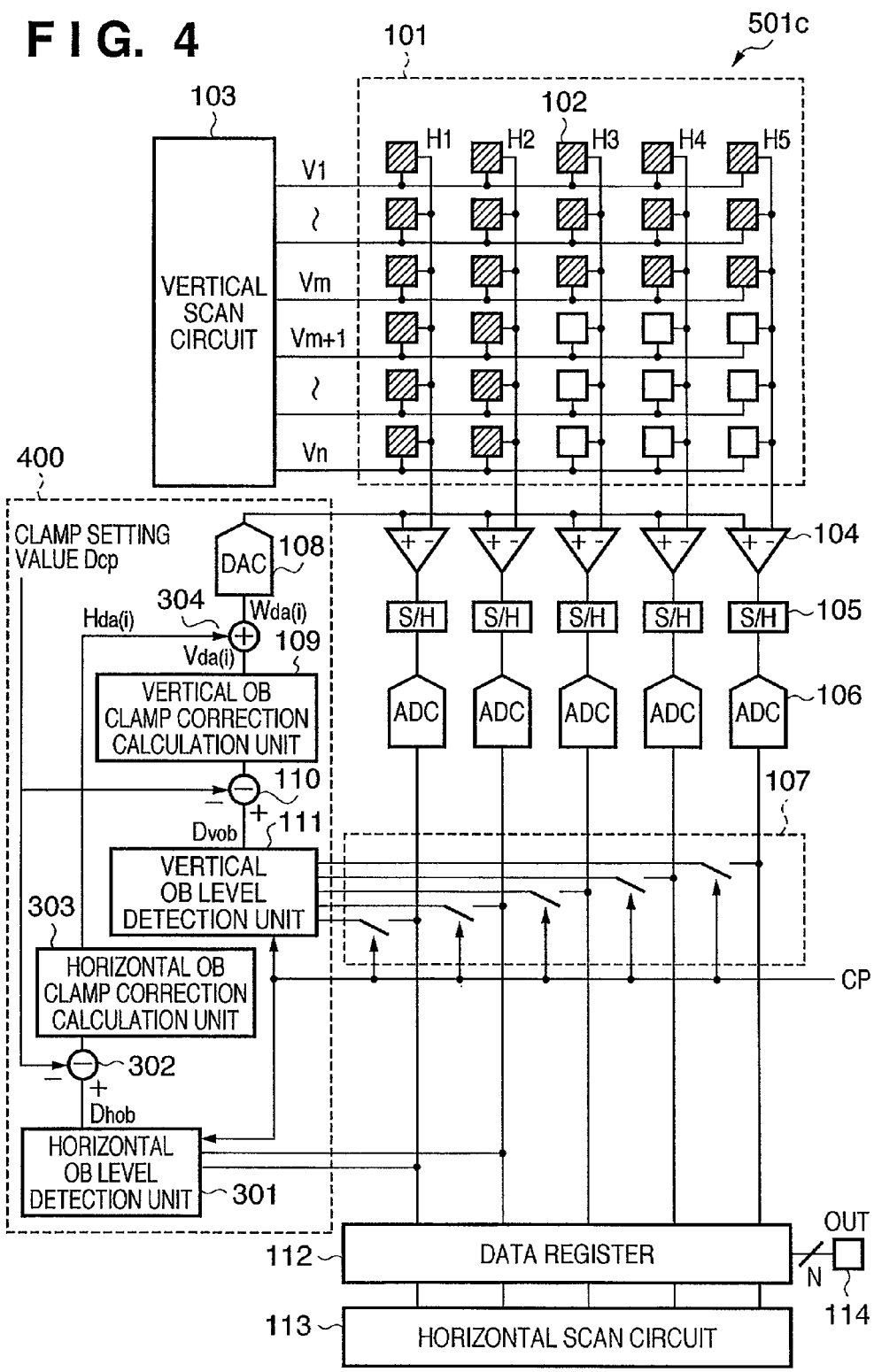
FIG. 4 is a block diagram showing a schematic internal configuration of an image sensing element according to a preferred second embodiment of the present invention.

FIG. 4 is a block diagram showing a schematic configuration of an image sensing element 501c according to a preferred second embodiment of the present invention. The image sensing element 501c according to the present embodiment is embodied as an example of the image sensing element 501 shown in FIG. 1. Note that in FIG. 4 the same reference numerals are attached to constituent elements that are similar to FIG. 2.

In FIG. 4, horizontal OBs (shading pixels provided horizontally in relation to the effective pixel area) have been added to FIG. 2, and a clamp operation from the m+1-th row onwards is performed using the data of the horizontal OBs (hereinafter, horizontal OB clamping).

Among the pixels 102 in the image sensing unit 101, the shading pixels 102 that are disposed in the shading pixel area read out using the drive lines Vm+1 to Vn which are common with the effective pixels (second shading pixel area) and connected to the vertical output lines H1 and H2 are horizontal OBs. The shading pixels 102 connected to the drive lines V1 to Vm are vertical OBs, similar to FIG. 2. A feedback control unit 400 is provided with a vertical OB level detection unit 111, a subtractor 110, a vertical OB clamp correction calculation unit 109, a D/A converter 108, a horizontal OB level detection unit 301, a subtractor 302, and a horizontal OB clamp correction calculation unit 303.

The reading out of the rows is similar to the first embodiment. A difference, however, lies in the fact that the output signal of the vertical OB clamp correction calculation unit 109 is set in the D/A converter 108 after being added to the output signal of the horizontal OB clamp correction calculation unit 303 by an adder 304, rather than being directly set in the D/A converter 108. The clamp operation with the horizontal OBs will now be described.

The horizontal OB level detection unit 301 outputs a clamp setting value Dcp when the clamp pulse CP is high. Consequently, until the m+1-th row is read out, only the OB clamp operation using the data of the vertical OBs described in the first embodiment is performed, without substantively performing the horizontal OB clamp operation.

The clamp pulse CP is set to low when the operation to read out the m+1-th row is started, and the horizontal OB level detection unit 301 detects the level of the horizontal OBs (i.e., pixels connected to drive lines Vm+1 to Vn and vertical output lines H1, H2). As for the calculation method of the horizontal OB level detection unit 301, various methods can be employed similarly to the vertical OB level detection unit 111, although the calculation of the average value of one row of horizontal shading pixels is given here as an example, with the computed result given as Dhob.

The calculation result Dhob of the horizontal OB level detection unit 301 is input to the subtractor 302. The subtractor 302 subtracts the clamp setting value Dcp from the above Dhob, and inputs the amount of error with the clamp setting value (=Dhob−Dcp) to the horizontal OB clamp correction calculation unit 303.

The horizontal OB clamp correction calculation unit 303 computes the horizontal OB clamp correction amount in a similar manner to the vertical OB clamp correction calculation unit 109. That is, the horizontal OB clamp correction calculation unit 303 performs a clipping process using a coefficient that takes into account the circuit gain of the various constituent elements and a coefficient for eliminating the effects of random noise and pixel defects.

Here, the conversion coefficient α for the circuit gain component is the same as the vertical OB clamp correction calculation unit 109, while a coefficient β' for eliminating the effects of random noise and pixel defects and the clip threshold Dmax' of the error amount may differ from the vertical OB clamp correction calculation unit 109. The output signal Hda(i) of the horizontal OB clamp correction calculation unit 303 in the i-th row is represented by the following equation (2):

$$Hda(i)=\alpha*\beta'*(Dhob-Dcp)+Hda(i-1)$$

$$(if(Dhob-Dcp)<Dmax')$$

$$Hda(i)=\alpha*\beta'*Dmax'+Hda(i-1)$$

$$(if(Dhob-Dcp)\geq Dmax') \quad (2)$$

Since the horizontal OB level detection unit 301 outputs the clamp setting value Dcp in the case where the clamp pulse CP is high, however, Hda(i)=0 until the m+1-th row is read out, as described above.

The output signal Hda of the horizontal OB clamp correction calculation unit 303 is added by the adder 304 to Vda held by the vertical OB clamp correction calculation unit 109, and the resultant signal is set in the D/A converter 108. That is, the analog setting value Wda(i) output from the D/A converter 108 is represented by the following equation (3):

$$Wda(i)=Vda(i)+Hda(i) \quad (3)$$

As described above, the second embodiment not only secures the dynamic range of the ADCs 106 and other circuits by performing a clamping process with the vertical OBs, but also enables further improvements in the accuracy of removal of the dark current component to be achieved by performing horizontal OB clamping using vertically-extending shaded pixels of the image sensing element.

In the foregoing description, the horizontal OB level detection unit 301 computes the average value of all of the horizontal OBs in one row, although the area for computing the average value may be restricted so as to compute the average value of a portion of the pixels. The computation of the horizontal OB levels for each line is not limited to averaging. Any method may be used provided it is based on the pixel data of the horizontal OBs, examples of which include computing median values or weighted averages.

Also, in the foregoing description, an OB clamp operation is performed vertically on all lines having vertical OBs or horizontal OBs, although the area may be restricted and lines provided on which the OB clamp operation is not implemented.

Further, in the foregoing description, the horizontal OB level detection unit 301, the subtractor 302, and the horizontal OB clamp correction calculation unit 303 are provided as an independent block. However, they may be configured to share the circuitry of the vertical OB level detection unit 111, the subtractor 110, and the vertical OB clamp correction calculation unit 109.

Third Embodiment

Figure 5:
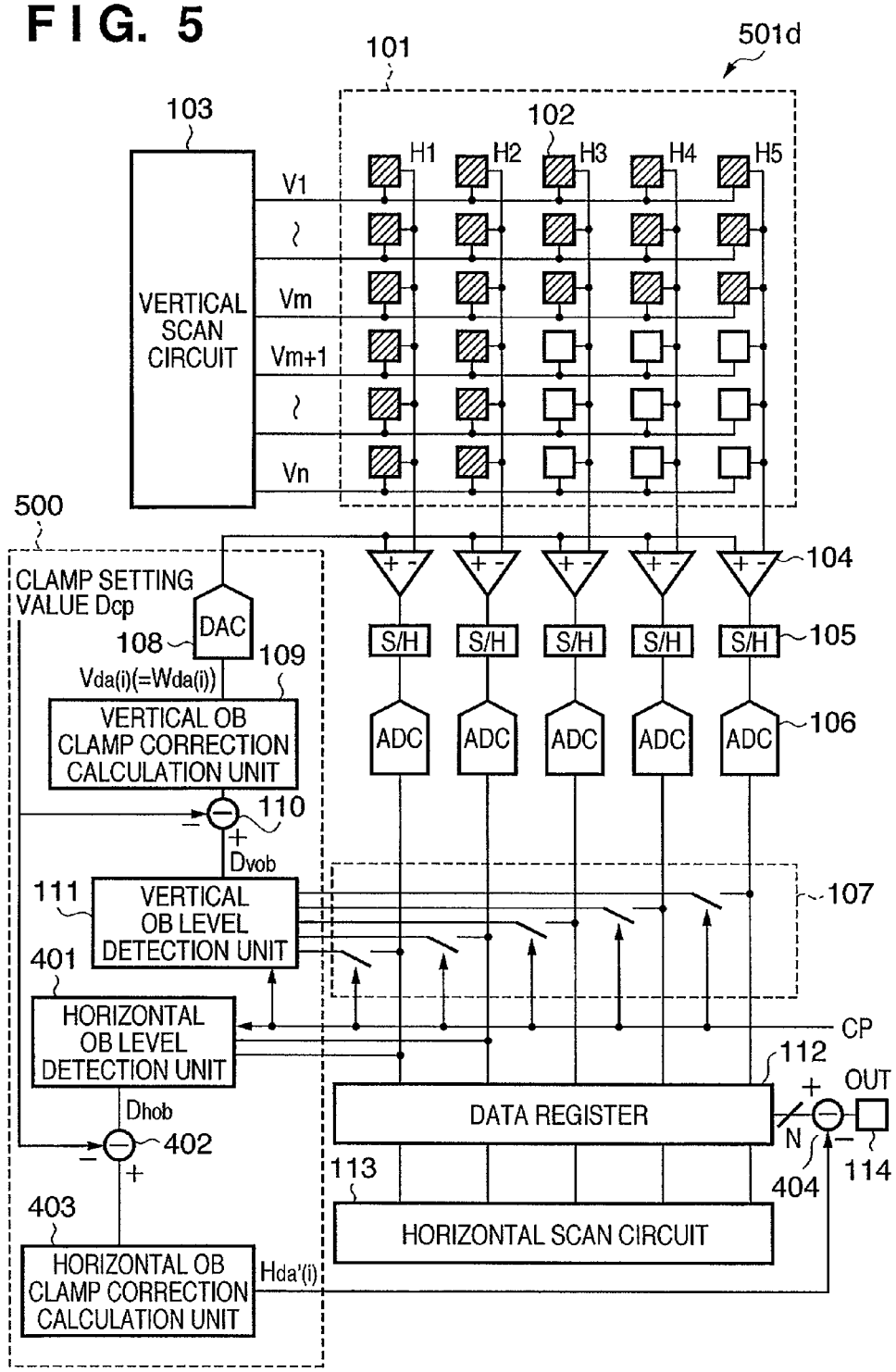
FIG. 5 is a block diagram showing a schematic internal configuration of an image sensing element according to a preferred third embodiment of the present invention.

FIG. 5 is a block diagram showing a schematic configuration of an image sensing element 501d according to a preferred third embodiment of the present invention. The image sensing element 501d according to the present embodiment is embodied as an example of the image sensing element 501 shown in FIG. 1. Note that in FIG. 5 the same reference numerals are attached to constituent elements that are similar to FIG. 2.

In FIG. 5, horizontal OBs (shading pixels provided horizontally in relation to the effective pixel area) have been added to FIG. 2, and a horizontal OB clamp operation is performed from the m+1-th row onwards. A difference with the second embodiment, however, lies in the fact that the subtraction and correction of the horizontal OB clamp operation is performed with a digital signal rather than an analog signal.

The operation to read out the each row is the same as the first embodiment. A feedback control unit 500 is provided with a vertical OB level detection unit 111, a subtractor 110, a vertical OB clamp correction calculation unit 109, a D/A converter 108, a horizontal OB level detection unit 401, a subtractor 402, and a horizontal OB clamp correction calculation unit 403. Note that the operations of the horizontal OB level detection unit 401 and the subtractor 402 are similar to the operations of the horizontal OB level detection unit 301 and the subtractor 302.

The horizontal OB clamp correction calculation unit 403 computes the horizontal OB clamp correction amount by performing a clipping process using Dmax' and the coefficient β' for eliminating the effects of random noise, pixel defects and the like. Different from the second embodiment, the coefficient α that takes into account the gain of the various constituent elements is not required, since the horizontal OB clamping process is here performed using a digital calculation.

The output signal (offset compensation signal) Hda'(i) of the horizontal OB clamp correction calculation unit 403 is represented by the following equation (4):

$$Hda'(i)=\beta'*(Dhob-Dcp)+Hda'(i-1)$$

$$(if(Dhob-Dcp)<Dmax')$$

$$Hda'(i)=\beta'*Dmax'+Hda'(i-1)$$

$$(if(Dhob-Dcp)\geq Dmax') \quad (4)$$

A subtractor 404 subtracts Hda'(i) from the data of the columns read out sequentially from the data register 112. The same Hda'(i) is thereby subtracted from all of the data of one row. The horizontal OB clamp operation is thus realized. The results of the subtractor 404 are sequentially output from an output terminal (OUT) 114.

As described above, the third embodiment, similarly to the second embodiment, enables output to be performed after also correcting the vertical shading of the image sensing element by performing horizontal OB clamping, in addition to securing the dynamic range by performing a clamping process with the vertical OBs.

The area used in the calculation by the horizontal OB level detection unit 401 may be restricted in the horizontal direction, similarly to the second embodiment. Also, the computation of the horizontal OB levels for each line is not limited to averaging. Any method may be used provided it is based on the pixel data of the horizontal OBs, examples of which include computing median values or weighted averages.

In the foregoing description, an OB clamp operation is performed vertically on all lines having vertical OBs or horizontal OBs, although the area may be restricted and lines provided on which the OB clamp operation is not implemented.

In the preceding embodiments, the shaded pixels were arranged in rows 1 to m or in rows 1 to m and columns 1 and 2. However, it is not necessary to arrange the shaded pixels in this way. Any arrangement of shaded pixels can be used and in the minimum case just one shaded pixel can be used. However, preferably there should be a suitable number of shaded pixels to achieve reliable results from averaging of the shaded pixels (or whatever process is used). Preferably also the shaded pixels should be distributed in at least the vertical and horizontal directions of the pixel array, so as to enable account to be taken of variations arising from pixel position. Such variations may arise from manufacturing variations and/or from operating variations such as voltage and temperature variations across the pixel array.

In the preceding embodiments the processing carried out for each pixel column includes amplification and analog-to-digital conversion. However, the present invention is not limited to such processing. The present invention is applicable to any image sensing device having a plurality of mutually-similar signal processing circuits, each corresponding to a different one of the pixel columns, and each operable to receive the respective output signals of at least the effective pixels of the corresponding column and to apply predetermined processing to the received output signals so as to produce processed signals dependent thereon. For example, the compensation carried out by the present invention can usefully be applied to any signal processing circuit that has a limited dynamic range.

In the preceding embodiments compensation is carried out by a feedback control unit 200 including a level detection unit and a clamp correction calculation unit for the vertical OBs or by a feedback control unit 400 or 500 including units for the vertical OBs and further units for the horizontal OBs. However, these are just example constitutions. Embodiments of the present invention can use any suitable form of compensation circuitry, provided in common for two or more different pixel columns, for supplying a compensation signal, dependent upon the output signal of at least one shaded pixel, to the respective signal processing means corresponding to those two or more different pixel columns.

In the preceding embodiments, the primary errors which are compensated relate to dark currents of the image sensor and offset errors of analog parts of the signal processing circuitry. However, it is possible to use the compensation technique of the present invention to compensate for any suitable errors in the image sensor and/or signal processing circuits.

In the preceding embodiments, a single instance of the compensation circuitry (feedback control unit) is provided in common for all pixel columns. However, it would also be possible to provide two or more instances of the compensation circuitry, each instance being provided in common for two or more different pixel columns. Such an arrangement of "shared" compensation circuitry would still provide a saving in chip area as compared to an arrangement having an instance of the compensation circuitry per pixel column.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-51935, filed on Mar. 1, 2007, which is hereby incorporated by reference herein its entirety.

What is claimed is:

1. An image sensing apparatus comprising:
   an image sensing unit configured to have a plurality of pixels, each including a photoelectric conversion unit, that are arrayed, an effective pixel area in which light is incident on the photoelectric conversion units of the arrayed pixels, and a shaded pixel area in which the photoelectric conversion units of the arrayed pixels are shielded from light;
   a plurality of analog-to-digital conversion units configured to be connected one-to-one to a plurality of columns of the arrayed pixels, each of the plurality of columns includes at least one pixel arrayed in the effective pixel area and at least one pixel arrayed in the shaded pixel area;
   a feedback control unit configured to output, as a common offset compensation signal for the plurality of columns, an offset compensation signal for compensating for an amount of error between a reference value and an output signal of the shaded pixel area output from at least two of the plurality of analog-to-digital conversion units; and
   a plurality of offset compensation units configured to be arranged one-to-one on the input side of each of the plurality of analog-to-digital conversion units, and to compensate offsets by subtracting the common offset compensation signal from an output signal of the effective pixel area.

2. The image sensing apparatus according to claim 1, wherein said feedback control unit outputs, as the common offset compensation signal, an offset compensation signal for compensating for an amount of error between the reference value and an output signal of the shaded pixel area output from a part of the plurality of analog-to-digital conversion units.

3. The image sensing apparatus according to claim 1, wherein each of said plurality of offset compensation units amplifies a difference between the common offset compensation signal and an output signal from a column of the effective pixel area corresponding to the offset compensation unit.

4. An image sensing system comprising:
   an optical system for forming an object image; and
   an image sensing apparatus as claimed in claim 1.

* * * * *